United States Patent
Genda

(10) Patent No.: US 9,456,106 B2
(45) Date of Patent: Sep. 27, 2016

(54) IMAGE PROCESSING APPARATUS AND IMAGE PROCESSING METHOD

(71) Applicant: KONICA MINOLTA, INC., Chiyoda-ku, Tokyo (JP)

(72) Inventor: Daisuke Genda, Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/881,916

(22) Filed: Oct. 13, 2015

(65) Prior Publication Data
US 2016/0134780 A1    May 12, 2016

(30) Foreign Application Priority Data

Nov. 11, 2014  (JP) .................................. 2014-228717

(51) Int. Cl.
| | | |
|---|---|---|
| *G06K 15/00* | (2006.01) | |
| *H04N 1/407* | (2006.01) | |
| *H04N 1/409* | (2006.01) | |
| *H04N 1/387* | (2006.01) | |

(52) U.S. Cl.
CPC .............. *H04N 1/387* (2013.01); *H04N 1/407* (2013.01); *H04N 1/4092* (2013.01)

(58) Field of Classification Search
CPC .... H04N 1/387; H04N 1/407; H04N 1/4092; H04N 1/58; H04N 1/6033; H04N 1/6058; G06K 15/02; G06T 7/0083
USPC ................................ 358/1.9, 3.27, 3.28, 3.13
See application file for complete search history.

(56) References Cited

U.S. PATENT DOCUMENTS

| | | | |
|---|---|---|---|
| 7,586,650 B2 | 9/2009 | Washio | |
| 8,279,483 B2 | 10/2012 | Kubo et al. | |
| 8,705,128 B2* | 4/2014 | Kakutani | B41J 2/2132 358/1.9 |
| 8,749,851 B2 | 6/2014 | Kashibuchi | |
| 9,217,949 B2* | 12/2015 | Kurigata | G03G 15/041 |

FOREIGN PATENT DOCUMENTS

| | | |
|---|---|---|
| JP | 2005341249 A | 12/2005 |
| JP | 2009211376 A | 9/2009 |
| JP | 2012124875 A | 6/2012 |

* cited by examiner

*Primary Examiner* — Douglas Tran
(74) *Attorney, Agent, or Firm* — Holtz, Holtz & Volek PC

(57) ABSTRACT

An image processing apparatus includes a contour extracting unit, a contour processing unit, a dithering unit and a binarizing unit. The contour extracting unit extracts a contour pixel forming a contour part from pixels of image data having multiple gradation values. The contour processing unit performs adjustment to reduce a gradation value of the contour pixel extracted by the contour extracting unit. The dithering unit binarizes, by using a blue noise dither matrix, the gradation value of the contour pixel subjected to the adjustment by the contour processing unit. The binarizing unit binarizes, of the pixels of the image data, a gradation value of a non-contour pixel which is other than the contour pixel.

7 Claims, 8 Drawing Sheets

* : CONTOUR PIXEL

* : PIXEL TO BE ADJUSTED
TO HAVE 100% GRADATION VALUE

▨ : ADJACENT PIXEL
TO REDUCE GRADATION VALUE

IMAGE PROCESSING APPARATUS AND IMAGE PROCESSING METHOD

1. FIELD OF THE INVENTION

The present invention relates to an image processing apparatus and an image processing method.

2. DESCRIPTION OF THE RELATED ART

The line width of a text (character(s)/letter(s)), graphics or the like formed based on image data by an electrophotographic image forming apparatus may be larger than the original line width due to various causes such as dot gain and toner scattering. In order to prevent such increase in line width, thinning is performed on image data so as to reduce gradation values of the contour of a text, graphics or the like.

When image data to be subjected to thinning (i.e. to be thinned) is image data having multiple gradations (multiple-gradation image data) which are more than two gradations, the line width can be adjusted by thinning in units of less than one pixel. (Refer to, for example, Japanese Patent Application Publication No. 2005-341249.) However, when the image data is image data having two gradations (two-gradation image data), the gradation values of the contour can each be changed to only either the minimum gradation value or the maximum gradation value. Therefore, the line width can be adjusted in units of one pixel only. (Refer to, for example, Japanese Patent Application Publication No. 2009-211376.)

Then, when an image having two gradations is formed, image data having multiple gradations is thinned so that the line width can be adjusted in units of less than one pixel, and then binarized with dithering so as to be converted into image data having two gradations. In the binarization, a dither matrix which can form a higher lpi screen pattern is used for the contour than that for the non-contour region. This can form an image having two gradations in which the line width has been substantially adjusted in units of less than one pixel. (Refer to, for example, Japanese Patent Application Publication No. 2012-124875.)

However, the screen pattern formed with the dither matrix has periodicity in units of the dither matrix. Hence, even if lines having the same line width are formed on sheets (pages) of paper, when the forming positions of the lines on the respective pages, the inclination angles of the lines or the like are different, relationships between the respective lines and the phase of the dither matrix are different, and accordingly results of binarization of the contours of the thinned lines may be different. Thus, when images of lines are formed on sheets of paper based on thinned image data, the line widths may be different even if the original line widths are the same, depending on the positions where the lines are formed on the respective pages.

To prevent such difference in line width, it is effective to perform the binarizaion not with the dithering having periodicity but with error diffusion, thereby forming an aperiodic pattern. However, error diffusion requires a feedback step to diffuse errors and hence is unsuitable when increase in processing speed is desired.

BRIEF SUMMARY OF THE INVENTION

Objects of the present invention include providing an image processing apparatus and an image processing method each of which performs thinning in units of less than one pixel and provides two-gradation image data having high line-width reproducibility.

In order to achieve at least one of the above objects, according to a first aspect of a preferred embodiment of the present invention, there is provided an image processing apparatus including: a contour extracting unit which extracts a contour pixel forming a contour part from pixels of image data having multiple gradation values; a contour processing unit which performs adjustment to reduce a gradation value of the contour pixel extracted by the contour extracting unit; dithering unit which binarizes, by using a blue noise dither matrix, the gradation value of the contour pixel subjected to the adjustment by the contour processing unit; and a binarizing unit which binarizes, of the pixels of the image data, gradation value of a non-contour pixel which is other than the contour pixel.

According to a second aspect of the preferred embodiment of the present invention, there is provided an image processing method including: extracting a contour pixel forming a contour part from pixels of image data having multiple gradation values; performing adjustment to reduce a gradation value of the extracted contour pixel; binarizing, by using a blue noise dither matrix, the gradation value of the contour pixel subjected to the adjustment; and binarizing, of the pixels of the image data, a gradation value of a non-contour pixel which is other than the contour pixel.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein.

DETAILED DESCRIPTION OF THE INVENTION

Hereinafter, an embodiment of an image processing apparatus and an image processing method is described with reference to the drawings.

Figure 1:
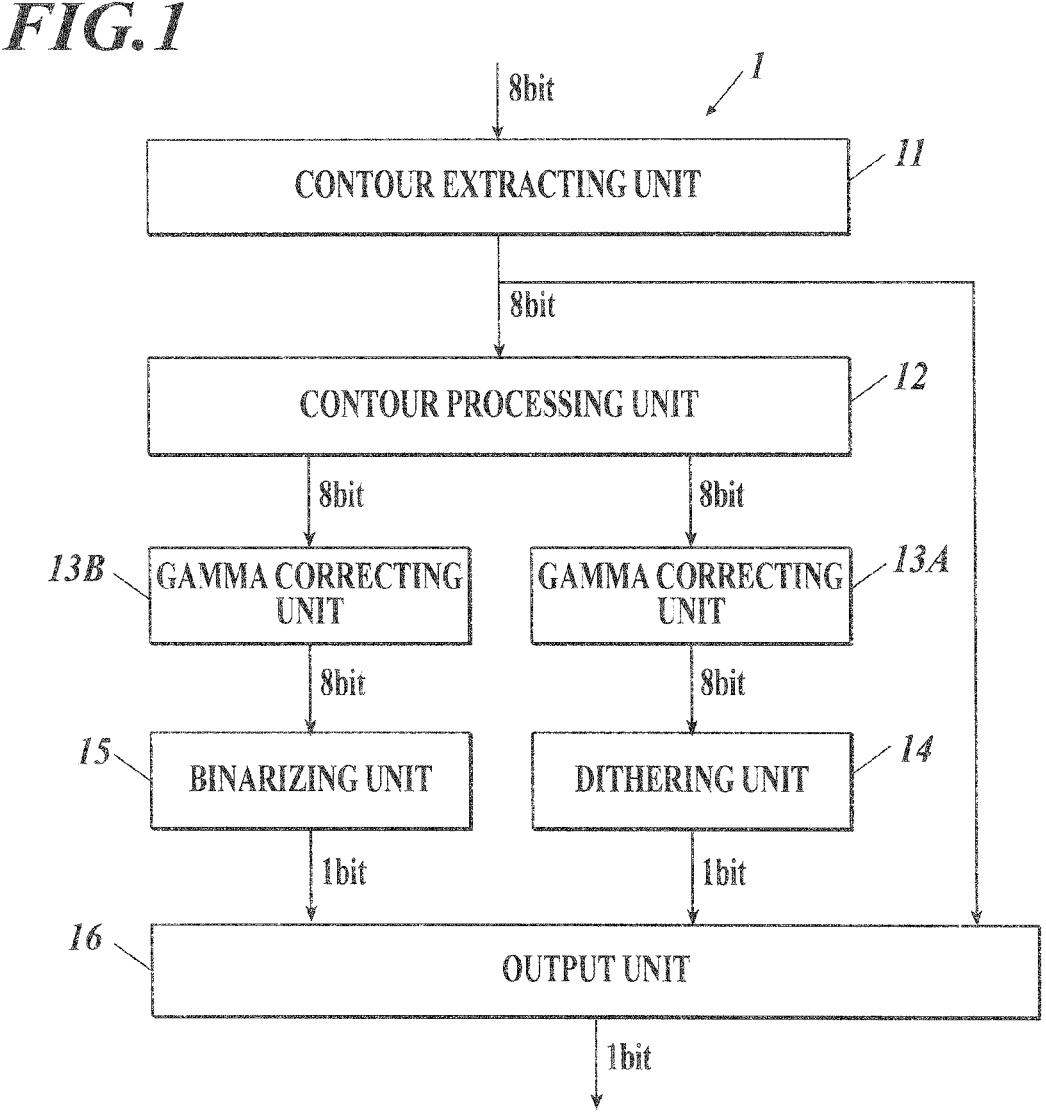
FIG. 1 is a block diagram showing functional components of an image processing apparatus according to an embodiment of the present invention.

FIG. 1 schematically shows the configuration of an image processing apparatus 1 according to an embodiment of the present invention.

The image processing apparatus 1 performs various types of image processing on multiple-gradation image data so as to output two-gradation image data. In the embodiment, 256-gradation image data made of 8-bit data per pixel is input, and two-gradation image data made of 1-bit data per pixel is output. However, the number of gradations of image data to be input may be any as far as it is more than two.

The image processing apparatus 1 includes, as shown in FIG. 1, a contour extracting unit 11, a contour processing unit 12, gamma correcting units 13A and 13B, a dithering unit 14, a binarizing unit 15 and an output unit 16.

The contour extracting unit 11 extracts contour pixels from pixels of the input 256-gradation image data. The contour pixels are pixels forming the contour of an image part of the foreground (main object) in an image of a text, graphics, picture or the like.

More specifically, with respect to each pixel of the 256-gradation image data, image data of 3×3 pixels having the pixel at the center is input into the contour extracting unit 11, and the contour extracting unit 11 determines whether or not the pixel at the center is a contour pixel based on differences between the gradation value of the pixel and the gradation values of its adjacent pixels.

Figure 2:
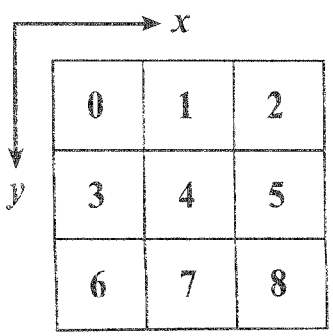
FIG. 2 shows 3×3 pixels.

FIG. 2 shows an example of the 3×3 pixels. The 3×3 pixels are represented by 0 to 8 which are their respective identification numbers.

The contour extracting unit 11 calculates differences SP[u], SP[d], SP[l] and SP[r] between the gradation value of the pixel 4 located at the center of the 3×3 pixels and the gradation values of its adjacent pixels 1, 7, 3 and 5 respectively located over, under, left of and right of the pixel 4.

The differences SP[u], SP[d], SP[l] and SP[r] are expressed by the following formulae, wherein C[4], C[1], C[7], C[3] and C[5] represent the gradation values of the pixel 4 and the adjacent pixels 1, 7, 3 and 5, respectively.

$$SP[u]=C[4]-C[1]$$

$$SP[d]=C[4]-C[7]$$

$$SP[l]=C[4]-C[3]$$

$$SP[r]=C[4]-C[5]$$

The contour extracting unit 11 compares SP[u] with SP[d] and also compares SP[l] with SP[r] When SP[u]≠SP[d] or SP[l]≠SP[r], the difference in gradation value exists between the pixel 4 and its adjacent pixel, namely, the edge exists therein, so that the contour extracting unit 11 determines that the pixel 4 is a contour pixel.

When determining that the pixel 4 is a contour pixel, the contour extracting unit 11 determines edge direction at the pixel 4. The edge direction is direction from a smaller gradation value to a larger gradation value between the pixel 4 and the pixels 0, 1, 2, 3, 5, 6, 7 and 8.

The contour extracting unit 11 determines an edge direction component Px in the main scanning direction x and an edge direction component Py in the sub scanning direction y of the pixel 4. The contour extracting unit 11 determines Px=+1 when SP[l]>SP[r], determines Px=−1 when SP[l]<SP[r] and determines Px=0 when SP[l]=SP[r]. Further, the contour extracting unit 11 determines Py=+1 when SP[u]<SP[d], determines Py=−1 when SP[u]>SP[d] and determines Py=0 when SP[u]=SP[d].

Next, the contour extracting unit 11 determines the edge direction P of the pixel 4 by combination of the edge direction components Px and Py as follows.

When Px=+1 and Py=−1, P=4.
When Px=+1 and Py=0, P=2.
When Px=+1 and Py=+1, P=7.
When Px=0 and Py=−1, P=0.
When Px=0 and Py=+1, P=1.
When Px=−1 and Py=−1, P=6.
When Px=−1 and Py=0, P=3.
When Px=−1 and Py=+1, P=5.

The following TABLE 1 shows the edge direction represented by P=0 to 7. As shown in TABLE 1, the edge direction P is one of, in total, 8 directions which are 4 directions of the up, down, left and right directions and 4 directions of diagonal directions.

TABLE 1

| P | Edge Direction |
|---|---|
| 0 | ↓ |
| 1 | ↑ |
| 2 | → |
| 3 | ← |
| 4 | ↘ |
| 5 | ↖ |
| 6 | ↙ |
| 7 | ↗ |

The contour processing unit 12 performs adjustment to reduce the gradation values of the contour pixels extracted by the contour extracting unit 11.

The contour processing unit 12 performs weighted averaging of the gradation value of each contour pixel and the gradation value of its adjacent pixel located in the opposite direction to the edge direction P determined by the contour extracting unit 11 so as to reduce the gradation value of the contour pixel, thereby performing thinning. For example, when the edge direction P of a contour pixel is 3, namely, the left direction, the opposite direction is the right direction. Then, the contour processing unit 12 uses the adjacent pixel located right of the contour pixel for the weighted averaging.

The contour processing unit 12 can calculate the thinned gradation value of the contour pixel by the following formula, wherein C[OE] and C[PA] respectively represent the gradation value of the contour pixel and the gradation value of the adjacent pixel, and C[OEs] represents the thinned gradation value of the contour pixel.

$$C[OEs]=C[OE]\times f/100+C[PA]\times(100-f)/100$$

In the formula, f represents a thinning coefficient and can be appropriately determined within a range from 0 to 100%. The f may be set according to a level of intensity specified by a user from multiple levels thereof prepared as intensity of thinning. For example, in the case of levels 1 to 5 of intensity, f can be set as follows: f=75% when the specified level is level 1; f=60% when the specified level is level 2;

f=45% when the specified level is level 3; f=30% when the specified level is level 4; and f=10% when the specified level is level 5.

The adjacent pixel located in the opposite direction to the edge direction P is a pixel which constitutes the background (background pixel) and has a smaller gradation value than the contour pixel which constitutes the foreground. As shown by the above formula for C[OEs], the gradation value of the contour pixel can be reduced by merging (mixing) the gradation value of the contour pixel with the gradation value of the adjacent pixel.

Figure 3:
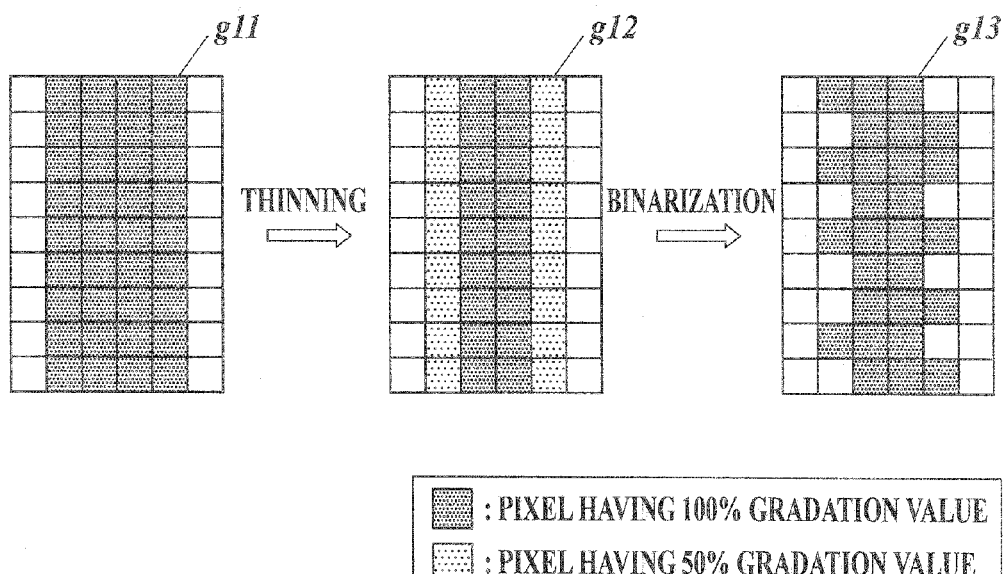
FIG. 3 shows process of thinning and binarizing an image of a line.

FIG. 3 shows an example of thinning an image g11 of a line having a line width of four pixels and having the maximum (100%) gradation value(s).

As shown in FIG. 3, when the contour extracting unit 12 performs thinning to reduce the gradation value of each contour pixel by 50% on the image g11 of the line having a gradation value of 255, an image g12 of the line having, as the gradation value of each contour pixel, a gradation value of 127, which is half (50%) the gradation value of each contour pixel of the image g11, is obtained. When the dithering unit 14 binarizes the image g12, a two-gradation image g13 of the pixels each having a gradation value of 0, which is the minimum gradation value, or a gradation value of 255, which is the maximum gradation value, is obtained.

Thus, in the contour part having the gradation value(s) adjusted by thinning to the intermediate gradation value(s) being larger than the minimum gradation value, i.e. 0, and smaller than the maximum gradation value, i.e. 255, the contour pixels having the maximum gradation value, i.e. 255, and the contour pixels having the minimum gradation value, i.e. 0, coexist after the binarization. Depending on the arrangement of the contour pixels, a large step may be generated in the contour part and visually recognized as image quality deterioration.

Figure 4:
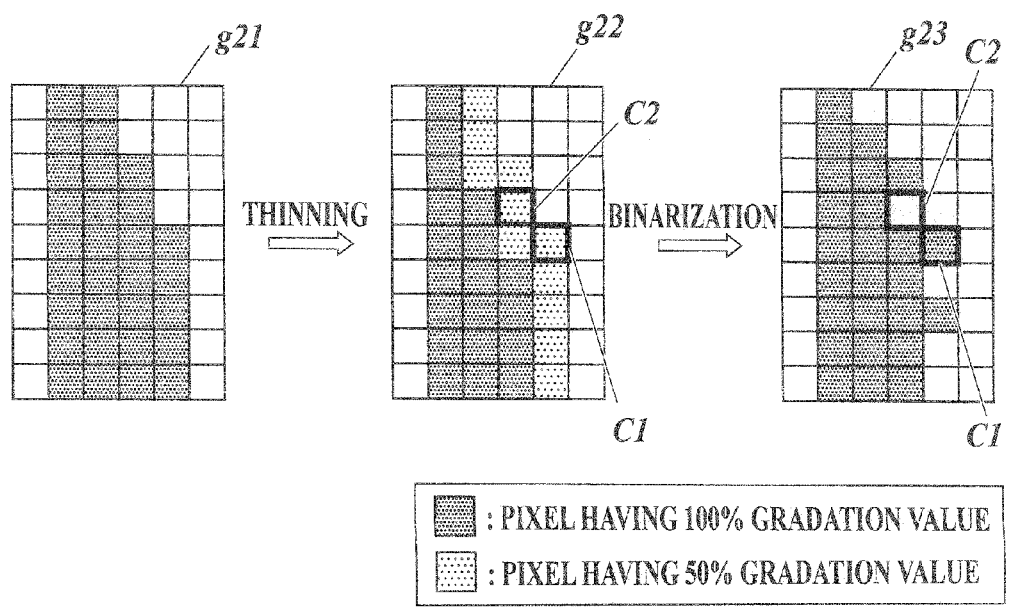
FIG. 4 shows the process of thinning and binarizing an image of a line the contour of which inclines.

For example, as shown in FIG. 4, when thinning to reduce the gradation value of each contour pixel by 50% is performed on an image g21 of a line the contour of which inclines, an image g22 having, as the gradation value of each contour pixel, the 50% gradation value is obtained, and when the image g22 is binarized, an image g23 is obtained. In the contour part of the image g23, a step of two pixels is generated. This is because a contour pixel C1 and a contour pixel C2 arranged stepwise, at the upper stair and the lower stair, respectively, in the image g22 have a gradation value of 255, which is the maximum gradation value, and a gradation value of 0, which is the minimum gradation value, in the binarized image g23, respectively. Thus, the step in the contour part is expanded from one pixel to two pixels. The larger the step is, the more conspicuous the bumpiness is and accordingly the more easily the image quality deterioration is recognized.

In order to prevent image quality deterioration to be caused by such step expansion, preferably the contour processing unit 12 (i) identifies a contour pixel(s) which generates a step of two or more pixels in the contour part if its gradation value becomes the minimum gradation value by the binarization by the dithering unit 14 and (ii) adjusts the gradation value of the identified contour pixel to the maximum gradation value.

The contour pixel adjusted to have the maximum gradation value is output with the maximum gradation value even after the binarization. This can prevent image quality deterioration to be caused by a step of two or more pixels generated in the contour part due to the identified contour pixel.

The contour processing unit 12 may generate a control signal to compulsorily output the maximum gradation value as the binarized gradation value of the identified contour pixel and output the control signal to the dithering unit 14, thereby adjusting the gradation value of the identified contour pixel so as to be the maximum gradation value by the binarization.

The dithering unit 14 then compulsorily makes the contour pixel identified by the contour processing unit 12 have the maximum gradation value in response to the control signal input from the contour processing unit 12 regardless of the binarization result. This can prevent image quality deterioration to be caused by a step of two or more pixels generated in the contour part due to the identified contour pixel.

Instead of the above adjustment, the contour processing unit 12 may invalidate the adjustment to reduce the gradation values of the contour pixels with respect to the identified contour pixel.

The original gradation value of a contour pixel is not the minimum gradation value. Hence, if thinning is not performed on the identified contour pixel, whereby the contour pixel keeps the original gradation value, the gradation value thereof tends to become the maximum gradation value by the binarization. This can prevent image quality deterioration to be caused by a step of two or more pixels generated in the contour part.

The contour processing unit 12 can identify the contour pixel which generates a step of two or more pixels in the contour part if its gradation value becomes the minimum gradation value by the binarization by the dithering unit 14, by comparing (a) each contour pixel extracted by the contour extracting unit 11 and its adjacent pixels with (b) a contour part pattern having a step of two or more pixels.

Figure 5:
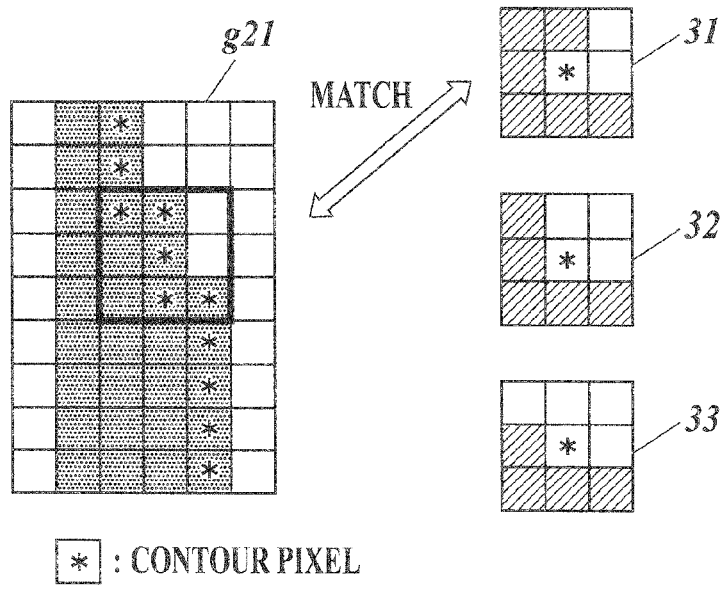
FIG. 5 shows patterns usable for identifying a contour pixel (s) which generates a step of two or more pixels in a contour part.

FIG. 5 shows patterns 31 to 33 usable for identifying such a contour pixel (s) In FIG. 5, the contour pixels are indicated by "*" marks.

As shown in FIG. 5, each of the patterns 31 to 33 is a contour part pattern of 3×3 pixels having a step of two or more pixels. In the patterns 31 to 33, the pixels indicated by oblique lines are pixels having non-minimum gradation values.

As shown in FIG. 5, with respect to each contour pixel in the image g21, the contour processing unit 12 extracts 3×3 pixels composed of the contour pixel and its adjacent pixels and compares the 3×3 pixels with each of the patterns 31 to 33. When the 3×3 pixels matches one of the patterns 31 to 33 in condition of the gradation values of the adjacent pixels, the contour processing unit 12 identifies the contour pixel located at the center of the 3×3 pixels as the contour pixel which generates a step of two or more pixels in the contour part if output with the minimum gradation value by the binarization.

For example, the 3×3 pixels enclosed by a thick line in the image g21 shown in FIG. 5 matches the pattern 31. Hence, the contour processing unit 12 identifies the contour pixel located at the center of the 3×3 pixels as the contour pixel which generates a step of two or more pixels.

When, for example, adjusting the gradation value of the identified contour pixel so as to be the maximum gradation value by the binarization, preferably the contour processing unit 12 reduces the gradation value of its adjacent pixel(s).

When the gradation value of the contour pixel supposed to become the minimum gradation value by the binarization is adjusted to the maximum gradation value, the line width increases by one pixel. However, reducing the gradation value of its adjacent pixel can prevent the line width from varying on the whole.

Preferably the contour processing unit 12 identifies, together with the contour pixel, the adjacent pixel (s) to reduce its gradation value by using the above patterns 31 to 33, the adjacent pixel(s) not newly generating a step of two or more pixels by the reduction.

Figure 6:
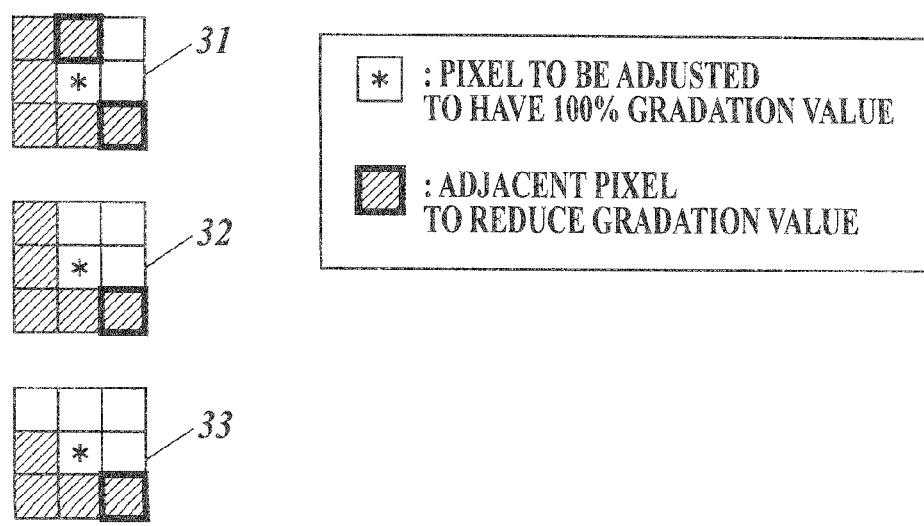
FIG. 6 shows the patterns in each of which one or more adjacent pixels to reduce their gradation values are specified.

FIG. 6 shows the patterns 31 to 33 in each of which one or more adjacent pixels to reduce their gradation values are specified.

The contour processing unit 12 can identify, as the adjacent pixel(s) to reduce the gradation value, the adjacent pixel(s) specified in the pattern 31, 32 or 33 which matches the 3×3 pixels when the contour processing unit 12 identifies the contour pixel to be adjusted to have the maximum gradation value by comparing the 3×3 pixels with each of the patterns 31 to 33.

In the case where two or more adjacent pixels are specified in the matched pattern 31, 32 or 33, the contour processing unit 12 may reduce the gradation value of one of the adjacent pixels or may reduce the gradation values of n (n≥2) adjacent pixels by 1/n×100% each.

The contour processing unit 12 may generate a control signal to compulsorily output the minimum gradation value as the binarized gradation value of the identified adjacent pixel and output the control signal to the dithering unit 14, thereby adjusting the gradation value of the identified adjacent pixel so as to be the minimum gradation value by the binarization. The dithering unit 14 then compulsorily makes the adjacent pixel identified by the contour processing unit 12 have the minimum gradation value in response to the control signal input from the contour processing unit 12 regardless of the binarization result. This can prevent the line width from varying on the whole.

The gamma correcting units 13A and 13B respectively perform gamma correction for contour pixels and gamma correction for non-contour pixels on the multiple-gradation image data in which the gradation values of the contour pixels have been adjusted by the contour processing unit 12.

Gamma correction is processing to correct gradation values of pixels such that density characteristics of an image formed on paper match target density characteristics, the image being formed based on image data by an image forming apparatus.

Each of the gamma correcting units 13A and 13B obtains corrected gradation values by using a conversion table in which the corrected gradation values are defined for respective gradation values. Content of binarization on contour pixels is different from that on non-contour pixels, and density characteristics of contour pixels of an image formed on paper are also different from those of non-contour pixels of the image. Therefore, the gamma correcting units 13A and 13B use different conversion tables.

The dithering unit 14 binarizes, with dithering, the gradation values of the pixels of the image data gamma-corrected by the gamma correcting unit 13A.

The dithering unit 14 uses a blue noise dither matrix for binarization. The blue noise dither matrix is a type of dispersed-dot dither matrixes, and the pattern of threshold values set in the dither matrix has blue noise characteristics. The blue noise characteristics are noise characteristics with which the pattern is aperiodic and isotropic and has a small amount of low frequency components. The screen pattern formed with the blue noise dither matrix has dots aperiodically and uniformly dispersed on the whole and exhibits the blue noise characteristics.

Figure 7A:
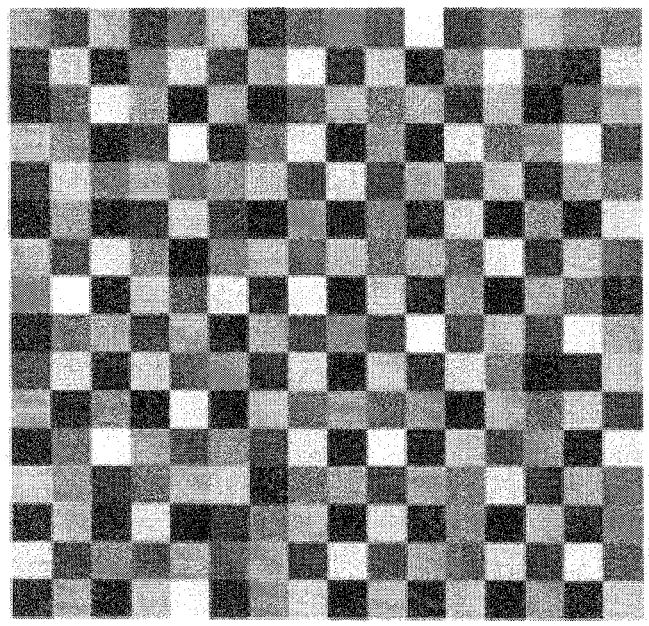
FIG. 7A shows a pattern of threshold values of a blue noise dither matrix.
Figure 7B:
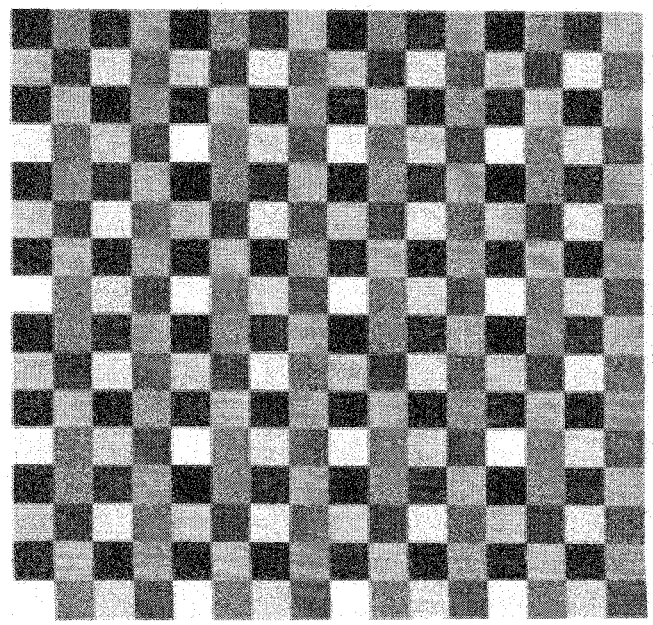
FIG. 7B shows a pattern of threshold values of a Bayer dither matrix.

FIG. 7A and FIG. 7B show patterns of threshold values set in the blue noise dither matrix and the Bayer dither matrix, respectively. In each of FIG. 7A and FIG. 7B, the density of each pixel in the dither matrix shows the magnitude of the threshold value. The higher the density is, the smaller the threshold value set in the pixel is. In binarization, an m×n pixels dither matrix is compared with image data in units of m×n pixels, and when the gradation value of a pixel of the image data is smaller than the threshold value set in its corresponding pixel in the dither matrix, the minimum gradation value is output, whereas when the gradation value of the pixel is equal to or larger than the threshold value, the maximum gradation value is output. Thus, binarization is performed.

Both the blue noise dither matrix and the Bayer dither matrix are types of dispersed-dot dither matrixes. However, as it is understood by comparison of FIG. 7A with FIG. 7B, the blue noise dither matrix has an aperiodic and isotropic pattern of threshold values.

Using the blue noise dither matrix for binarization on contour pixels makes line-width reproducibility higher than using another dither matrix therefor.

Figure 8:
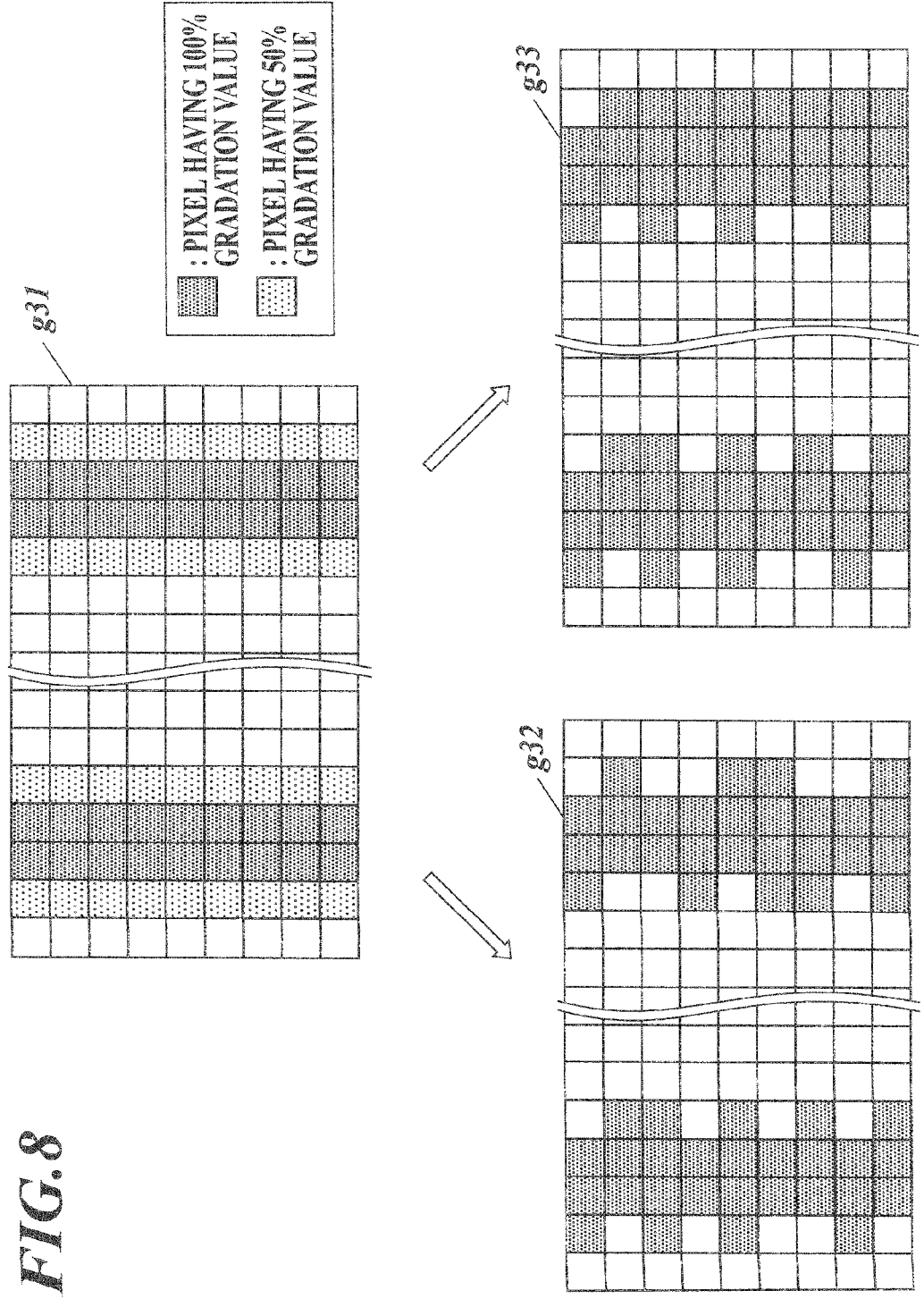
FIG. 8 shows images respectively obtained by binarizing, with the blue noise dither matrix and the Bayer dither matrix, gradation values of contour pixels of two vertical lines subjected to thinning.

FIG. 8 shows an image g31 obtained by thinning to reduce the gradation value of each contour pixel by 50% on an image of two lines each having a line width of four pixels and having the maximum gradation value as the gradation value of each contour pixel.

As shown in FIG. 8, when the blue noise dither matrix is used for binarization on the contour pixels of the image g31, an image g32 is obtained, whereas when the Bayer dither matrix is used for binarization thereon, an image g33 is obtained.

Because the blue noise dither matrix has dots aperiodically and uniformly dispersed, the two lines in the image g31 are both reproduced as lines each having a line width of three pixels in average in the image g32, whereas because the Bayer dither matrix has periodicity, the contours of the two lines in the image g31 are differently reproduced in the image g33 due to a relationship between the position of each line and the phase of the period. That is, the line on the left side in the image g31 is reproduced as a line having a line width of three pixels in average in the image g33, whereas the line on the right side in the image g31 is reproduced as a line having a line width of nearly four pixels in average in the image g33. Thus, the Bayer dither matrix makes a line become thick or thin depending on the position of the line on a page, and therefore line-width reproducibility is low.

Figure 9A:
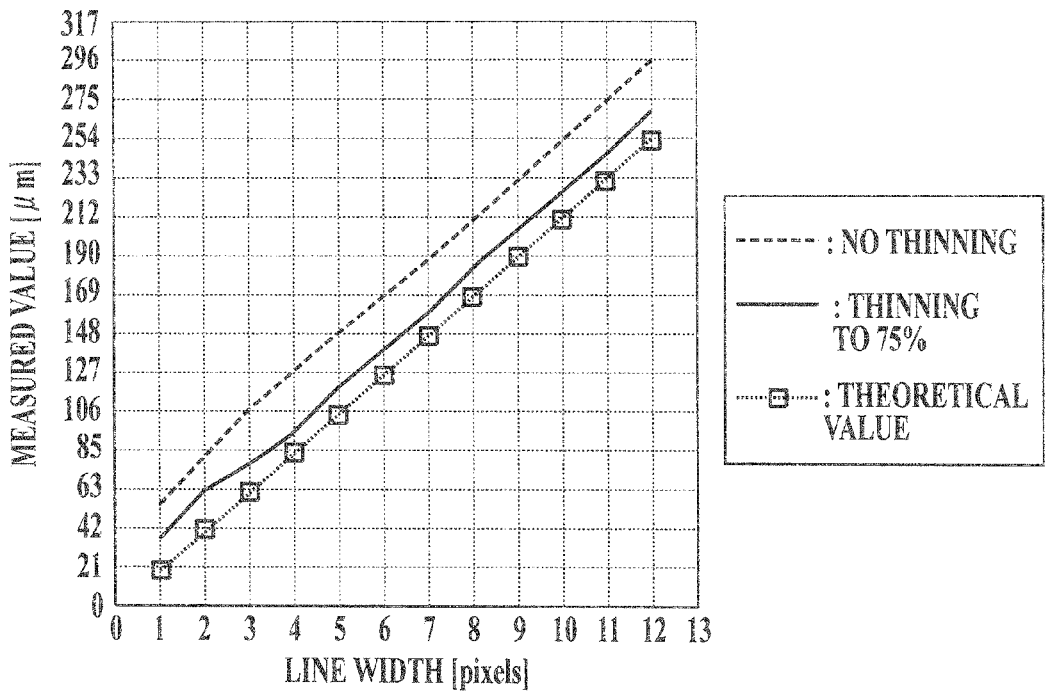
FIG. 9A shows measured values of line widths of lines each having contour pixels binarized with the blue noise dither matrix.
Figure 9B:
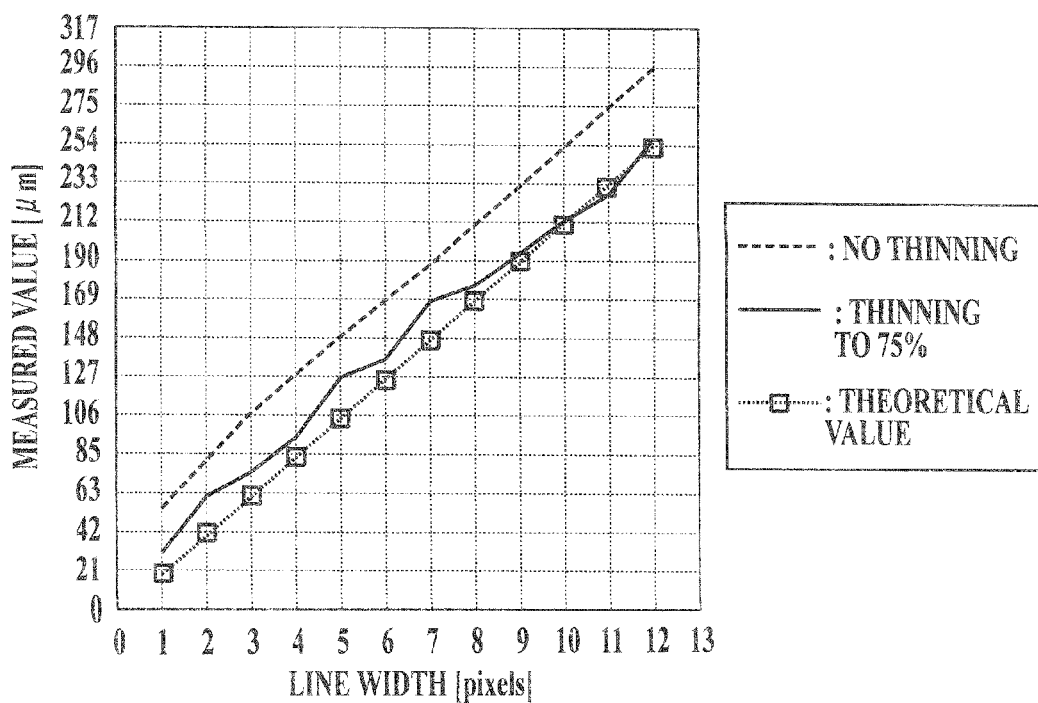
FIG. 9B shows measured values of line widths of lines each having contour pixels binarized with the Bayer dither matrix.

FIG. 9A shows a result of measurement of line widths of lines each having contour pixels binarized with the blue noise dither matrix, the measurement being carried out on images of the lines formed on sheets of paper. The line widths are 1 to 12 pixels (1200 dpi), respectively. FIG. 9B shows a result measurement of line widths of lines each having contour pixels binarized with the Bayer dither matrix, the measurement being carried out on images of the lines formed on sheets of paper. The line widths are 1 to 12 pixels (1200 dpi), respectively.

When the line width is accurately reproduced, as shown in FIG. 9A and FIG. 9B as the theoretical value, the measured value increases by about 21 μm as the line width increases by one pixel. In reality, however, the line width increases by dot gain or the like during image formation. Hence, if thinning is not performed, even a line width of one pixel has a measured value of about 54 μm as shown in FIG. 9A and FIG. 9B.

In both of the case where the binarization is performed with the blue noise dither matrix and the case where the binarization is performed with the Bayer dither matrix, when thinning has been performed such that the line width becomes 75%, the measured value of the line width is smaller than that when no thinning has been performed. Thus, the effect of thinning can be seen.

However, while any line width is reproduced as about its 75% line width when the blue noise dither matrix is used, the line width is reproduced as less than 75% line width or more than 75% line width depending on the line width when the Bayer dither matrix is used. Thus, the line-width reproducibility with thinning performed is not stable when the Bayer dither matrix is used as compared with when the blue noise dither matrix is used.

The binarizing unit 15 binarizes the gradation values of the pixels of the image data gamma-corrected by the gamma correcting unit 13B. The method for binarization employed by the binarizing unit 15 is not particularly limited and hence may be binarization with a dot-concentrated dither matrix or binarization with the Bayer dither matrix. Error diffusion may be used therefor, but dithering is preferable in terms of processing speed-up.

The output unit 16, of the pixels of the image data, selects and outputs the image data output from the dithering unit 14 with respect to the contour pixels determined, by the contour extracting unit 11, and selects and outputs the image data output from the binarizing unit 15 with respect to the non-contour pixels.

Thereby, the output unit 16 can output image data in which at least the contour has been binarized with the blue noise dither matrix.

Figure 10:
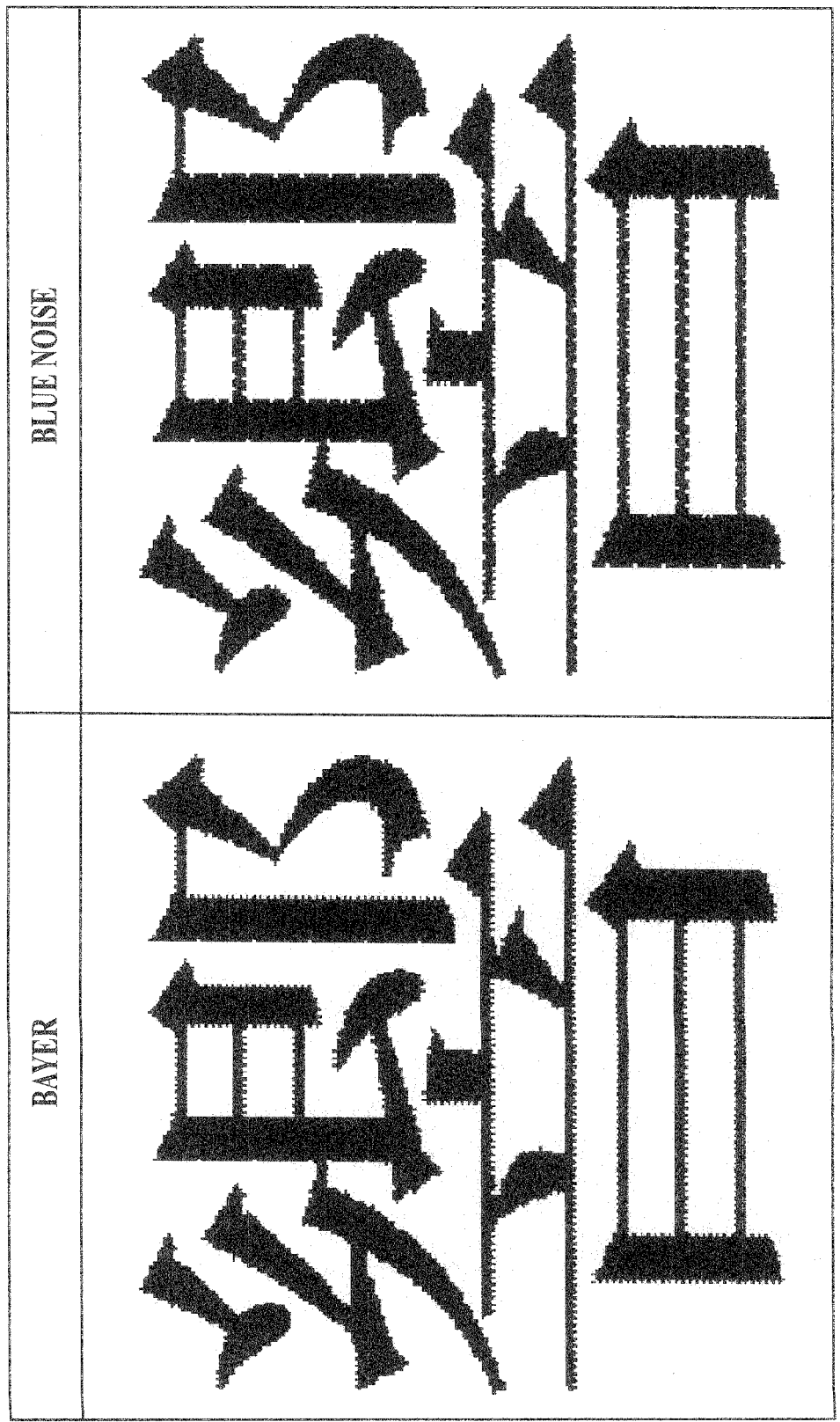
FIG. 10 shows an example and a comparative example of image processing on a letter, the image processing including thinning and binarization.

FIG. 10 shows a letter formed by the image processing apparatus 1 with the blue noise dither matrix for binarization on contour pixels as an example and also shows a letter formed with the Bayer dither matrix for binarization on the same contour pixels as a comparative example.

As shown in FIG. 10, in the letter formed with the Bayer dither matrix, vertical lines each having both sides thinned and vertical lines each having one side thinned coexist, and therefore the line widths are different depending on the positions of the vertical lines although they are originally the same.

On the other hand, in the letter formed with the blue noise dither matrix, the line widths are not different depending on the positions of the vertical lines and the lines are uniformly thinned.

As described above, the image processing apparatus 1 according to the embodiment of the present invention includes: the contour extracting unit 11 which extracts a contour pixel (s) forming a contour part from pixels of image data having multiple gradation values (multiple-gradation image data); the contour processing unit 12 which performs adjustment to reduce the gradation value of the contour pixel extracted by the contour extracting unit 11; the dithering unit 14 which binarizes, by using the blue noise dither matrix, the gradation value of the contour pixel subjected to the adjustment by the contour processing unit 12; and the binarizing unit 15 which binarizes the gradation value(s) of a non-contour pixel(s) which is other than the contour pixel.

The image processing apparatus 1 thus configured can reduce (adjust) the gradation values of multiple-gradation image data to the intermediate gradation values and therefore can perform thinning in units of less than one pixel. Further, the image processing apparatus 1 can provide two-gradation image data by performing binarization after the thinning.

Further, the image processing apparatus 1 can binarize the contour, the gradation values of which have been reduced by thinning, with the blue noise dither matrix and therefore can aperiodically disperse dots in the contour of a formed image. Thereby, the image processing apparatus 1 can have stable and constant contour reproducibility and therefore can reproduce the same line width regardless of the position where the line is formed on a page. Thus, the image processing apparatus 1 can provide two-gradation image data having high line-width reproducibility.

The above embodiment is one of preferred examples of the present invention and hence the present invention is not limited thereto. The present invention can be appropriately modified within a scope not departing from the spirit of the present invention.

For example, a computer such as a CPU (Central Processing unit) reading a program may perform the following procedure, whereby software processing can realize the same processing content as the image processing apparatus 1.

Figure 11:
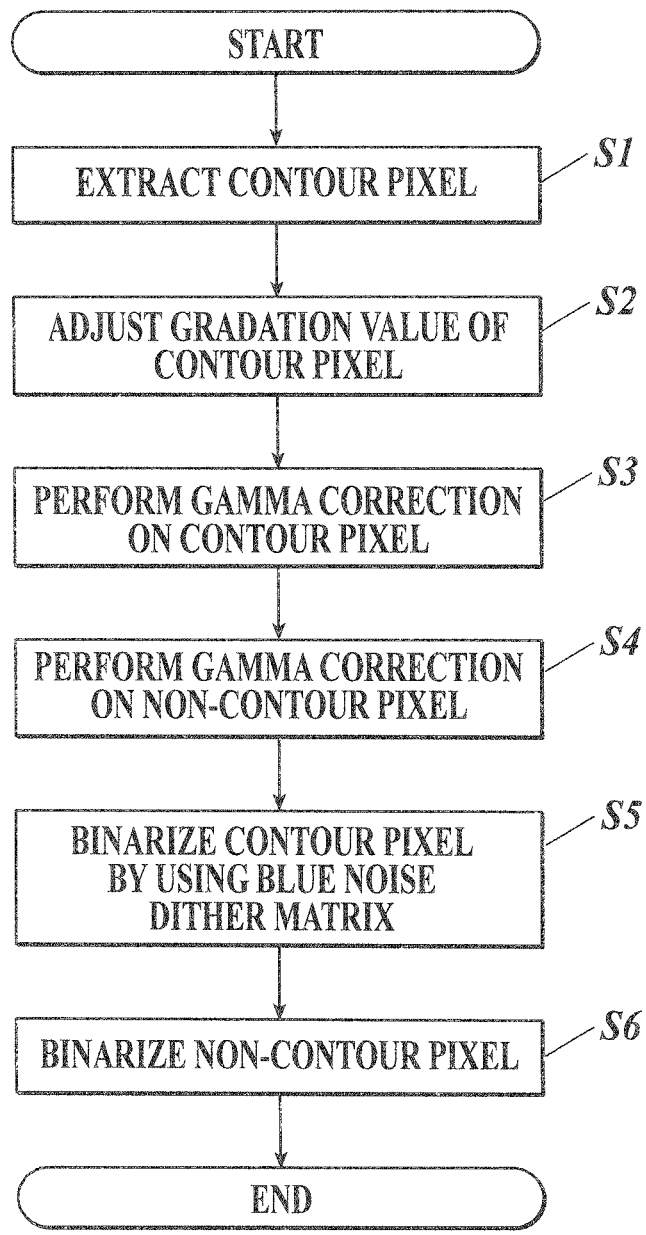
FIG. 11 is a flowchart of a procedure of the image processing which includes thinning and binarization.

FIG. 11 shows the procedure taken by a CPU to realize the same processing content as the image processing apparatus 1.

As shown in FIG. 11, the CPU extracts, from input multiple-gradation image data, contour pixels of a text or the like (Step S1) and performs adjustment to reduce the gradation values of the extracted contour pixels (Step S2). The specific method for extracting the contour pixels and the specific method for adjusting the gradation values are the same as those employed by the contour extracting unit 11 and the contour processing unit 12 described above. The CPU performs g correction on the extracted contour pixels by using a conversion table for contour pixels (Step S3) and performs gamma correction on pixels (non-contour pixels) other than the extracted contour pixels by using a conversion table for non-contour pixels (step S4).

The CPU binarizes the gamma-corrected contour pixels by using the blue noise dither matrix in the same way as the dithering unit 14 (Step S5). The CPU also binarizes the gamma-corrected non-contour pixels in the same way as the binarizing unit 15 (Step S6).

By taking this procedure, two-gradation image data is obtained through the same image processing as the image processing apparatus 1 performs.

As a computer readable medium storing the program thereon, a nonvolatile memory such as a ROM or a flash memory or a portable storage medium such as a CD-ROM can be used. Further, as a medium to provide data of the program via a communication line, a carrier wave can be used.

This application is based upon and claims the benefit of priority under 35 U.S.C. 119 of Japanese Patent Application No. 2014-228717 filed Nov. 11, 2014, the entire disclosure of which, including the specification, claims, drawings and abstract, is incorporated herein by reference in its entirety.

What is claimed is:
1. An image processing apparatus comprising:
   a contour extracting unit which extracts a contour pixel forming a contour part from pixels of image data having multiple gradation values;
   a contour processing unit which performs adjustment to reduce a gradation value of the contour pixel extracted by the contour extracting unit;
   a dithering unit which binarizes, by using a blue noise dither matrix, the gradation value of the contour pixel subjected to the adjustment by the contour processing unit; and a binarizing unit which binarizes, of the pixels of the image data, a gradation value of a non-contour pixel which is other than the contour pixel.

2. The image processing apparatus according to claim 1, wherein the contour processing unit (i) identifies, of the extracted contour pixel, a contour pixel which generates a step of two or more pixels in the contour part if a gradation value becomes a minimum gradation value by the binarization by the dithering unit and (ii) adjusts the gradation value of the identified contour pixel to a maximum gradation value.

3. The image processing apparatus according to claim herein the contour processing unit (i) identifies, of the extracted contour pixel, a contour pixel which generates a step of two or more pixels in the contour part if a gradation value becomes a minimum gradation value by the binarization by the dithering unit and (ii) invalidates the adjustment to reduce the gradation value of the contour pixel with respect to the identified contour pixel.

4. The image processing apparatus according to claim 1, wherein
the contour processing unit identifies, of the extracted contour pixel, a contour pixel which generates a step of two or more pixels in the contour part if a gradation value becomes a minimum gradation value by the binarization by the dithering unit, and
the dithering unit outputs a maximum gradation value as the gradation value of the identified contour pixel.

5. The image processing apparatus according to claim 2, wherein the contour processing unit performs the identification by comparing (a) the extracted contour pixel and an adjacent pixel which is adjacent to the extracted contour pixel with (b) a contour part pattern having a step of two or more pixels.

6. The image processing apparatus according to claim 2, wherein the contour processing unit reduces a gradation value of an adjacent pixel which is adjacent to the identified contour pixel.

7. An image processing method comprising:
extracting a contour pixel forming a contour part from pixels of image data having multiple gradation values;
performing adjustment to reduce a gradation value of the extracted contour pixel;
binarizing, by using a blue noise dither matrix, the gradation value of the contour pixel subjected to the adjustment; and
binarizing, of the pixels of the image data, a gradation value of a non-contour pixel which is other than the contour pixel.

* * * * *